United States Patent
Leary

(10) Patent No.: US 9,584,937 B2
(45) Date of Patent: Feb. 28, 2017

(54) MOVIE THEATER HEADSET

(71) Applicant: Rhett Clinton Leary, Chuluota, FL (US)

(72) Inventor: Rhett Clinton Leary, Chuluota, FL (US)

( * ) Notice: Subject to any disclaimer, the term of this patent is extended or adjusted under 35 U.S.C. 154(b) by 0 days.

(21) Appl. No.: 14/884,720

(22) Filed: Oct. 15, 2015

(65) Prior Publication Data

US 2016/0112791 A1   Apr. 21, 2016

Related U.S. Application Data

(60) Provisional application No. 62/064,112, filed on Oct. 15, 2014.

(51) Int. Cl.
*H04R 27/00* (2006.01)
*H04R 5/033* (2006.01)
*G06Q 30/00* (2012.01)

(52) U.S. Cl.
CPC ............. *H04R 27/00* (2013.01); *G06Q 30/00* (2013.01); *H04R 5/033* (2013.01)

(58) Field of Classification Search
None
See application file for complete search history.

(56) References Cited

U.S. PATENT DOCUMENTS

| | | | |
|---|---|---|---|
| 7,844,307 B2 * | 11/2010 | Henson ................. | H04M 1/677 370/311 |
| 8,155,335 B2 | 4/2012 | Rutschman | |
| 8,793,719 B2 * | 7/2014 | Cho ....................... | H04H 60/16 725/116 |
| 9,232,293 B1 * | 1/2016 | Hanson .................. | H04L 63/00 |
| 2006/0050908 A1 | 3/2006 | Shteyn | |
| 2006/0166716 A1 * | 7/2006 | Seshadri ............. | H04M 1/6033 455/575.2 |
| 2008/0318518 A1 | 12/2008 | Coutinho | |
| 2009/0281809 A1 * | 11/2009 | Reuss ..................... | G10L 17/24 704/273 |
| 2012/0159617 A1 * | 6/2012 | Wu ....................... | G06F 21/445 726/19 |
| 2012/0189134 A1 | 7/2012 | Wang | |
| 2012/0306774 A1 * | 12/2012 | Lee ....................... | G06F 3/0486 345/173 |

* cited by examiner

*Primary Examiner* — Paul Huber
(74) *Attorney, Agent, or Firm* — Allen Dyer Doppelt Milbrath & Gilchrist

(57) ABSTRACT

A movie theater headset accessible by access codes which are unique for the movie for an additional cost when the ticket is purchased for the movie at movie theaters. Within the theater or venue the audio portion of the movie is transmitted electronically, either wirelessly or on a wired network, and the headset allows the user to hear the transmission only when the access code is entered. The headsets may be rented or purchased at the theater or venue. Electronic stores may also sell the headsets, or conversion kits for existing headsets, which permit the use of the access codes for movies.

11 Claims, 2 Drawing Sheets

MOVIE THEATER HEADSET

CROSS-REFERENCE TO RELATED APPLICATIONS

This Application claims the benefit of U.S. Provisional Application No. 62/064,112, filed Oct. 15, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to movie theater equipment, and in particular to a movie theater headset. Three types of people are generally dissatisfied with the audio portion of the movie theater experience. Some patrons have sensitive hearing and would like to be able to turn down the volume, to prevent pain or injury. Others are hard of hearing, and would like to be able to turn up the volume. Others would like to enjoy a higher quality of sound than that provided by the theater's speakers, with the ability to control the volume as desired. A movie theater headset, which may be activated by an access code provided by theater personnel, would allow the user to control the volume and would resolve this problem. The invention herein described is not intended to be limited to movie theater applications, but is also expected to be of utility in other venues to include but not limited to bands, concerts, and sporting events such as football, soccer, NASCAR, etc.

SUMMARY OF THE INVENTION

Accordingly, the invention is directed to a movie theater headset. Theaters or other venues provide access codes which are unique for the movie for an additional cost when the ticket is purchased for the movie. Within the theatre or venue the audio portion of the movie is transmitted electronically, either wirelessly or on a wired network, and the headset allows the user to hear the transmission only when the access code is entered. The headsets may be rented or purchased at the theater or venue. Electronic stores may also sell the headsets, or conversion kits for existing headsets, which permit the use of the access codes for movies.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate two embodiments of the invention and, together with the description, serve to explain the principles of the invention.

DETAILED DESCRIPTION OF THE INVENTION

Figure 1:
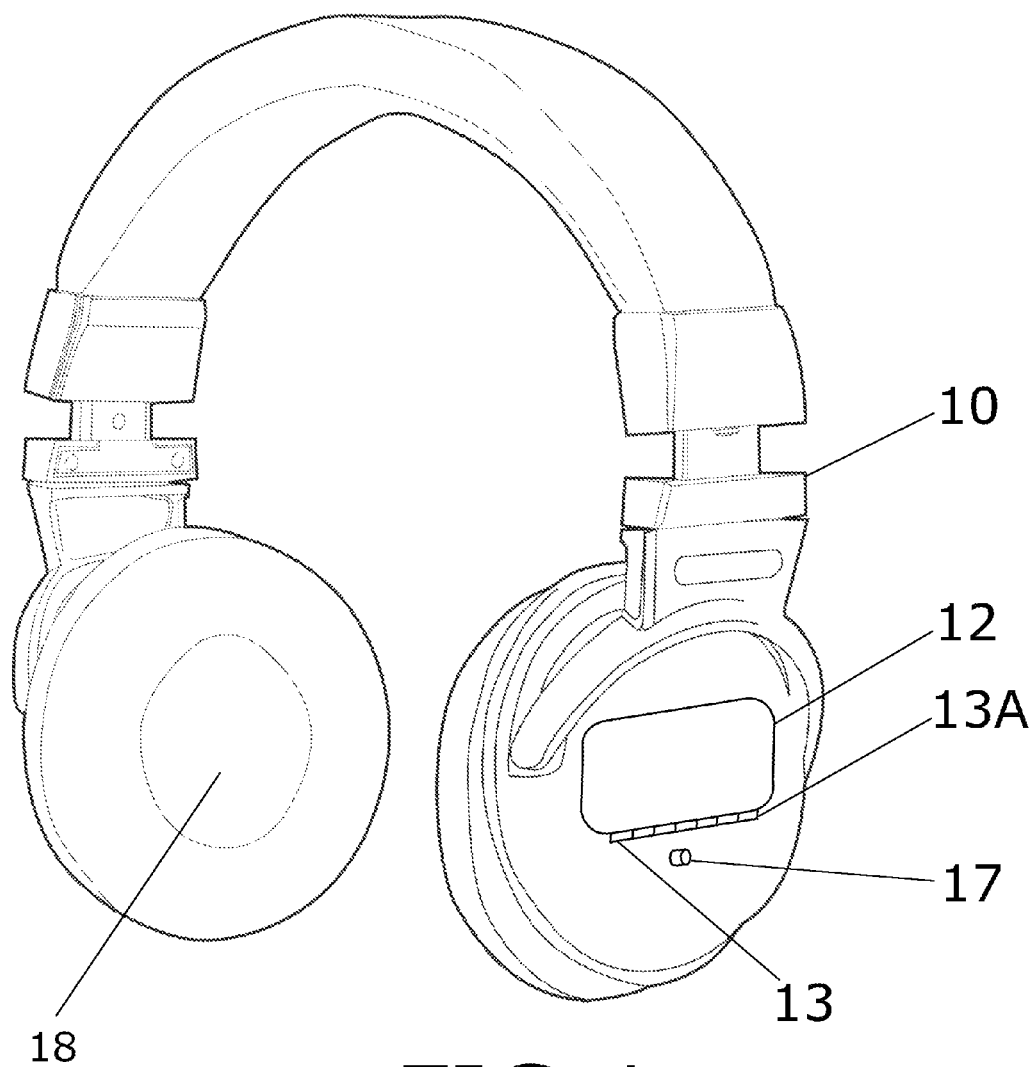
FIG. 1 is a side perspective view of the first exemplary embodiment, displaying the headset 10, the visual display 12, the keypad 13, the volume control 13A, and the indicator light 17.
Figure 2:
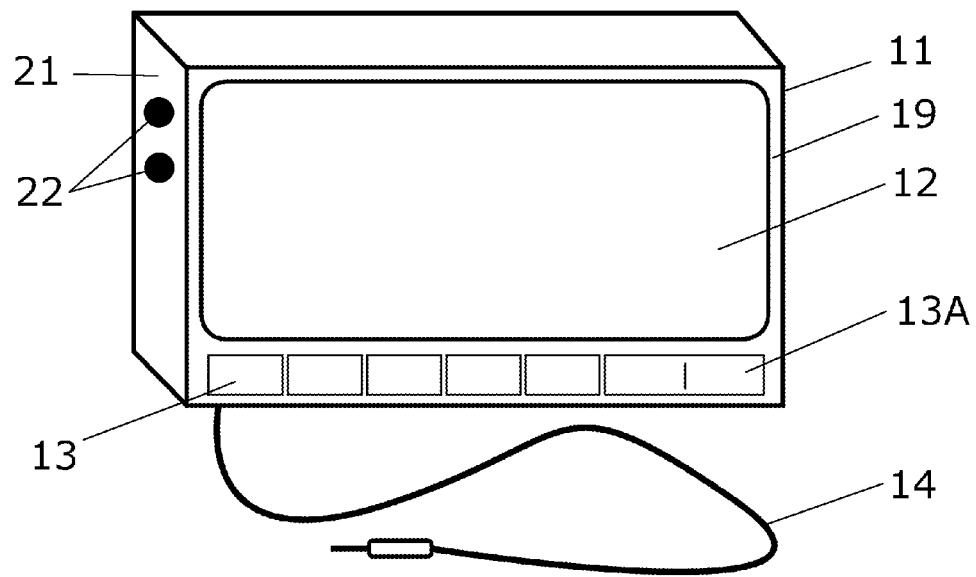
FIG. 2 is a front view of the adapter component of the second exemplary embodiment, displaying the adapter 11, the visual display 12, the keypad 13, the volume control 13A, and the cable 14.
Figure 3:
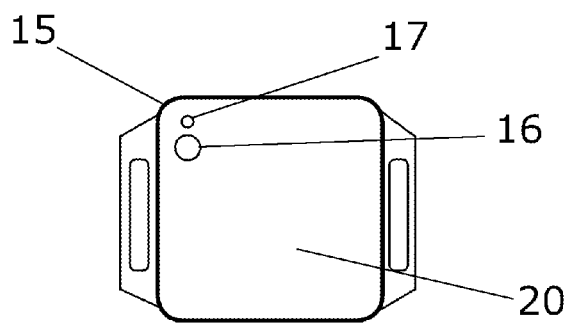
FIG. 3 is a top perspective view of the receiver component of the second exemplary embodiment, displaying the receiver 15, the socket 16, and the indicator light 17.

Referring now to the invention in more detail, the invention is directed to a movie theater headset 10.

The first exemplary embodiment is comprised of a headset 10 having speakers 18, which provides a visual display 12, a keypad 13, a volume control 13A, and an indicator light 17. Theaters or other venues provide access codes which are unique for the movie for an additional cost when the ticket is purchased for the movie. Within the theatre or venue the audio portion of the movie is transmitted electronically, either wirelessly using any one of several wireless data transmission protocols, or on a wired network, and the headset 10 allows the user to hear the transmission only when the access code is entered on the keypad 13. The visual display 12 and the indicator light 17 provide prompts and informs the user when access to the transmission has been successfully acquired. The headsets 10 may be rented or purchased at the theater or venue. Electronic stores may also sell the headsets 10.

The second exemplary embodiment is comprised of a conversion kit providing two components: an adapter 11, which provides a visual display 12, a keypad 13, and a means of adjusting volume 13A located on an adapter face 19, and a cable 14; and a receiver box 15 having an outside surface 20, which provides a socket 16 wherein the cable 14 may be plugged in. The conversion kit enables users with conventional headsets, such as those used with stereo systems or mobile digital music players, to access the audio portion of the movie. The side surface 21 of the adapter 11 provides a plurality of sockets 22 which accommodate all standard headset cables. The visual display 12, the keypad 13, and the volume control 13A function in the same manner as in the first exemplary embodiment.

The indicator light 17 on the receiver 15 confirms, when illuminated, that the audio portion of the movie has been successfully accessed and the cable 14 is connected. The theater or other venue may rent or sell the adapters 12, and may provide one receiver 15 installed at each seat, preferably on an armrest or on the rear surface of a seat or rail in front of the user's seat.

To use the first or the second exemplary embodiment, the user enters the access code when prompted by the visual display 12, using the keypad 13 which is provided. For the second exemplary embodiment, the user must then connect the user's headset to the adapter 11, and the cable 14 of the adapter 11 to the receiver 15. When the indicator light 17 indicates that the audio portion of the movie has been successfully accessed, the user may put on the headset 10 or the user's headset, and control the volume of the audio portion using the audio control 13A which is provided.

Preferably, the headset 10 of the first exemplary embodiment and the adapter 11 of the second exemplary embodiment are powered by replaceable batteries of a standard type. Preferably, the receiver 15 of the second exemplary embodiment is powered by batteries, although an alternate embodiment which may be wired directly to standard house current is contemplated.

Electronic components of the headset 10 preferably include a transmitter, a receiver, an internal antenna, and a reference oscillator. Electronic components of the adapter 11 preferably include a transmitter. Electronic components of the receiver 15 preferably include a receiver, an internal antenna, and a reference oscillator.

The headset 10 is preferably manufactured from rigid, durable materials, such as steel, aluminum alloy, plastic, and copper alloy, with earpads which are preferably manufactured from a flexible, durable material such as foam rubber. The adapter 11, the receiver 15, and the socket 16 are preferably manufactured from rigid, durable materials, such as steel, aluminum alloy, plastic, and copper alloy.

The visual display 12 and the indicator light 17 are preferably manufactured from rigid, durable materials which are transparent, such as methacrylate. The keypad 13 is preferably manufactured from a flexible, durable material which is easily cleaned, such as rubber or silicone. The cable 14 is preferably manufactured from braided copper alloy wire sheathed in plastic.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A movie theater headset, comprising:
   (a) a headset; said headset being headphones and having speakers;
   (b) a visual display;
   (c) a keypad;
   (d) a means of adjusting volume;
   (e) an indicator light;
   (f) a receiver;
   (g) said keypad being configured such that an access code may be entered;
   (h) said receiver being configured to receive a broadcast audio signal;
   (i) said headset being configured to play said broadcast audio signal when said access code is entered:
   (j) said visual display, said keypad, said means of adjusting volume, and said indicator light are located on said headset; and
   (k) said receiver is located within said headset.

2. The movie theater headset of claim 1, wherein said visual display and said indicator light provide visual prompts indicating whether said access code has been accepted and said broadcast audio signal is being played.

3. The movie theater headset of claim 1, wherein said access code is provided by a broadcaster such that access to said broadcast audio signal is unavailable without said access code.

4. A method of using the movie theater headset of claim 1, wherein a broadcaster broadcasts an audio signal; said broadcaster provides an access code to a user; said receiver receives said broadcast audio signal; said user enters said access code on said keypad; said access code grants access to said broadcast audio signal through said receiver; and said headset plays said audio signal through said speakers.

5. A method of using the movie theater headset of claim 2, wherein a broadcaster broadcasts an audio signal; said broadcaster provides an access code to a user; said headset receives said broadcast audio signal; said user enters said access code on said keypad; said visual display and said indicator light provide visual prompts indicating whether said access code has been accepted; said access code grants access to said broadcast audio signal through said receiver; and said headset plays said audio signal through said speakers.

6. A movie theater headset, comprising: a headset; said headset being headphones having speakers; a visual display; a keypad; a means of adjusting volume; an indicator light; a receiver; said keypad being configured such that an access code may be entered; said receiver being configured to receive a broadcast audio signal; said headset being configured to play said broadcast audio signal when said access code is entered; a conversion kit; said conversion kit comprising an adapter, a receiver box, and a connection cable; said visual display, said keypad, and said means of adjusting volume being located on an adapter face of said adapter; a plurality of sockets located on a side surface of said adapter; each of said plurality of sockets being configured to receive an audio cable connected to said headset; said plurality of sockets and said audio cable being configured to transmit said audio signal to said headset; said adapter and said receiver box being configured such that they are connected via said connector cable and said connector cable is capable of transmitting an audio signal; said indicator light being located on an outside surface of said receiver box; and said receiver being located within said receiver box.

7. The movie theater headset of claim 6, wherein said indicator light is configured to illuminate when said adapter is connected to said receiver box.

8. The movie theater headset of claim 6, wherein said indicator light is configured to illuminate when said access code is entered.

9. A method of using the movie theater headset of claim 6, wherein a broadcaster broadcasts an audio signal; said broadcaster provides an access code to a user; said receiver receives said broadcast audio signal; said user connects said headset to said adapter; said user connects said adapter to said receiver; said user enters said access code on said keypad; said access code grants access to said broadcast audio signal through said receiver; and said headset plays said audio signal through said speakers.

10. A method of using the movie theater headset of claim 7, wherein a broadcaster broadcasts an audio signal; said broadcaster provides an access code to a user; said receiver receives said broadcast audio signal; said user connects said headset to said adapter; said user connects said adapter to said receiver; said indicator light illuminates to indicated that said adapter is connected to said receiver; said user enters said access code on said keypad; said access code grants access to said broadcast audio signal through said receiver; and said headset plays said audio signal through said speakers.

11. A method of using the movie theater headset of claim 8, wherein a broadcaster broadcasts an audio signal; said broadcaster provides an access code to a user; said receiver receives said broadcast audio signal; said user connects said headset to said adapter; said user connects said adapter to said receiver; said user enters said access code on said keypad; said access code grants access to said broadcast audio signal through said receiver; said indicator light illuminates to indicated that access has been granted to said broadcast audio signal; and said headset plays said audio signal through said speakers.

* * * * *